United States Patent
Seguineau et al.

(10) Patent No.: US 7,228,076 B2
(45) Date of Patent: Jun. 5, 2007

(54) METHOD FOR REMODULATION OF A MODULATED OPTICAL SIGNAL AND DEVICE FOR REMODULATION AND TRANSMISSION SYSTEM

(75) Inventors: Frédéric Seguineau, Bures-sur-Yvette (FR); Olivier Leclerc, Ste-Geneviève-des-Bois (FR); Emmanuel Desurvire, St-Escobille (FR); Catherine Martinelli, Palaiseau (FR)

(73) Assignee: Alcatel, Paris (FR)

( * ) Notice: Subject to any disclaimer, the term of this patent is extended or adjusted under 35 U.S.C. 154(b) by 748 days.

(21) Appl. No.: 10/373,023

(22) Filed: Feb. 26, 2003

(65) Prior Publication Data

US 2003/0202797 A1     Oct. 30, 2003

(30) Foreign Application Priority Data

Apr. 24, 2002   (EP)  ................................. 02360129

(51) Int. Cl.
- *H04J 14/02* (2006.01)
- *H04B 10/00* (2006.01)
- *H01S 3/00* (2006.01)

(52) U.S. Cl. ....................... 398/155; 398/82; 398/92; 398/157; 398/160; 359/334; 359/341.3

(58) Field of Classification Search ................ 398/155, 398/79, 82, 92, 97, 157, 160; 359/334, 341.3, 359/341.31, 341.33
See application file for complete search history.

(56) References Cited

U.S. PATENT DOCUMENTS

| | | | |
|---|---|---|---|
| 5,457,559 A | * | 10/1995 | Saito et al. ................... 398/98 |
| 6,657,777 B1 | * | 12/2003 | Meli et al. .................. 359/334 |
| 2002/0191277 A1 | * | 12/2002 | Chen et al. ............. 359/341.4 |

FOREIGN PATENT DOCUMENTS

| | | |
|---|---|---|
| EP | 0 975 106 B1 | 12/2001 |
| WO | WO 99/21316 A1 | 4/1999 |
| WO | WO 02/13423 A2 | 2/2002 |

OTHER PUBLICATIONS

Lee J. H. et al: "A Holey Fibre Raman Amplifier and All-Optical Modulator" Optical Communication 2001, ECOC '01, vol. 6, Sep. 30, 2001-Oct. 4, 2001, pp. 46-47, XP002214540.

* cited by examiner

*Primary Examiner*—M. R. Sedighian
(74) *Attorney, Agent, or Firm*—Sughrue Mion, PLLC

(57) ABSTRACT

A method for remodulation of a modulated optical signal is disclosed which uses a disturbed line signal and an optical clock signal derived from the undisturbed original line signal modulated with the bitrate frequency feeding both signals in a Raman amplifying fiber connected to at least one Raman pump running the clock signal as Raman pump wavelength for the line signal.

10 Claims, 4 Drawing Sheets

Improved Raman modulator

METHOD FOR REMODULATION OF A MODULATED OPTICAL SIGNAL AND DEVICE FOR REMODULATION AND TRANSMISSION SYSTEM

BACKGROUND OF THE INVENTION

The invention is based on a priority application EP 02360129.7 which is hereby incorporated by reference.

The invention deals with a method for remodulation of a modulated optical signal using a disturbed line signal and an optical clock signal derived from the undisturbed original line signal modulated with the bitrate frequency, feeding both signals in a Raman amplifying fiber connected to at least one Raman pump and running the clock signal as Raman pump wavelength for the line signal.

The invention is also related to a device for remodulation of optical signals with an input for line signals and a coupler, the coupler connects the line and a Raman pump laser with a piece of Raman active fiber, and the Ramon pump laser is connected to a clock recovery device which modulates the Raman pump laser light with the bit rate frequency of the optical signal.

The invention is also related to a transmission system for transmission of optical signals in transmission lines comprising transmitter means, receiver means and regeneration means in the line where the regeneration means have devices to recover amplitude, clock and shape of the signals, the clock recovery device comprises means to recover an optical clock signal, the said optical clock signals is connected to a remodulation device as described in the invention.

Optical communication systems are a fast-growing constituent of communication networks. The term "optical communication system" as used in the following relates to any system or device which makes use of optical signals to transport information across an optical waveguiding medium. Optical communication systems comprise inter alia telecommunication systems, local area networks (LAN), cable television systems etc. Optical communications at ultra-high bit-rates with bit rates for example over 40 Gbit/s over long distance suffers from severe degradations occurring during propagation.

For the transmission capacity of optical fibres in optical communication systems is expected to advance in the future, the evolution of optical signal recovery is one of the core technologies involved in this process. A key to this evolution is the availability of extremely-broad-band optical devices, offering modulation, regeneration, amplification over nearly all the transmission window allowed by silica. In this respect, optical regeneration by synchronous modulation was proven to alleviate limitations of transmission due to reduction of timing litter, decreasing polarisation mode dispersion impact, improvement of optical signal-to noise ratio at low bit error rate levels.

For regeneration of optical signals in transmission system several solution are known.

Electro-optical interferometers are well known. But this InP or LiNbO$_3$ MZ devices, suffer from rather high insertion loss (>10 dB for InP, >8 dB for PI-concatenated LiNbO$_3$), which in turn limits or even suppresses the benefit of synchronous optical regeneration. They also face a problem from the operating speed limit imposed by electronic circuitries and electrode phase-matching which is typical 40 GHz. Their power consumption is rather high (>10 W), which limits their interest for submarine-cable applications. Finally, their optical power-handling capability is limited (<100 mW), which prevents massive/simultaneous WDM optical regeneration.

Also all optical semiconductor amplifiers are known.

For example the EP 0 975 106 discloses a system where a digital modulation is extracted for regeneration using an optical coupler and clock extractor, and semiconductor amplifiers are used in an amplitude or phase modulator arrangement to modulate soliton pulses. The device comprises an optical coupler and electro-optical recovery unit for recovery of the clock signal from the incoming signal in the input line (F1). This permits the extraction of digital information for regenerating use and a means of modulation of the amplitude and/or the phase of the solitons by the clock signal. The device is characterized by the use of a Mach-Zehnder modulator containing first and second optical semiconductor amplifiers arranged in two parallel arms with the gain of each modulated by the recovered clock signal.

The output signals from the recovery unit are fed to a splitting circuit providing, through delay circuits feedback to amplifiers in the modulator. The output line contains the-signal of same wavelength as the input line, with the clock signals blocked by the feedback signals.

Solution with semiconductor optical amplifiers as described in EP 0 975 106 face the problem that the all-optical components can operate beyond 40 GHz but at the expense of complexity.

Basically all the aforementioned approaches require costly semiconductor of electro-optic components, which are difficult to manufacture, to package and to optimize.

SUMMARY OF THE INVENTION

For all these reasons, a low-cost, all-optical synchronous modulator with significantly reduced insertion loss or internal gain, with low power consumption and with ultra-high speed potential (beyond 40 GHz) is required.

These requirements are met by a Roman amplification device.

Optical fibre Raman amplifiers (FRA) are well known and are known to be designed to operate at a desired wavelengths between 1.25 µm and 1.7 µm. FRA utilize silica-based fibres and display a high transparency when unpumped. The working principle of FRA is based on stimulated Raman scattering FRA can serve for example as a replacement for conventional repeaters or semiconductor-amplifiers, or for rare-earth-doped fibre amplifiers or in combination with them.

A Raman amplifier uses stimulated Raman scattering, which occurs in silica fibers when an intense pump beam propagates through it. Stimulated Raman scattering is an inelastic scattering process in which an incident pump photon looses its energy to create another photon of reduced energy at a lower frequency. The remaining energy is absorbed by the fiber medium in the form of molecular vibrations (i.e., optical phonons). That is, pump energy of a given wavelength amplifies a signal at a longer wavelength. This process is named a Stokes scattering. Vice versa an incident pump photon absorbs the energy of a molecular vibration and a photon with a higher energy than the incident photon is emitted. This process is a Anti-Stokes scattering.

Roman amplifiers offer a number of advantages over rare-earth doped amplifiers. For example, they are relatively low noise devices with a gain spectrum that is very broad in comparison to rare-earth doped amplifiers. Currently, Raman amplifiers can achieve up to 100 nm without band-splitting. Also, Raman amplifiers can be used for distributed amplification. That is, the same fiber that is used for signal transmission is also used for signal amplification. In contrast to distributed amplification, rare-earth doped optical amplifiers typically used only provide lumped amplification in which gain is imparted only in a particular section of fiber that contains an appropriate dopant. Raman amplifiers, however, may also be used to provide lumped amplification. Furthermore Raman amplifiers do not rely on the presence of a special amplifier fiber since the gain medium can be the transmission fiber itself.

Roman Amplifiers are also used as all optical modulators. The publication "A Holey Fiber Raman Amplifier and All-optical Modulator" J. H. Lee et all, University of Southampton—Paper PD.A.1.1 of ECOC' 2001 Conference, discloses a short length of highly nonlinear holey fiber to obtain strong L-band Raman amplification. This fiber is used for an all optical modulation experiment with a modulation frequency of 500 kHz applied on the pump laser.

This experimental setup does not work with the clock signal of a real transmitted signal and does not comprise a mean for extracting the clock signal.

The invention solve the problems of the modulation devices by using a method for remodulation of a high frequency modulated optical signals using a disturbed line signal and an optical clock signal derived from the undisturbed original line signal modulated with the bitrate frequency, feeding both signals in a Raman amplifying fiber connected to at least one Raman pump and running the clock signal as Roman pump wavelength for the line signal.

The advantage of the proposed method for remodulation of optical signals with a Roman modulator is that the modulation signal, the clock signal is in one step derived from the disturbed signal itself. The use of an optical clock recovery signal avoids problems with electronic high frequency modulators. The use of the method of the invention allows a simple adjustment of the modulation depth of the Raman signal by adapting the spectral position of the Raman pump in relation to the signal. This phase modulation dept can also be influenced by the pump power of the Raman pump.

Using at least two Raman pumps that are coupled in phase can avoid problem with by cross phase modulation. The method to couple the at least two Raman pump wavelengths out of phase allows the pure intensity modulation free of phase effects.

To couple at least two Raman pumps in phase will allow to get easily a pure phase modulation without intensity influences. For a pure intensity modulation the parasitic phase effects due to Kerr effect are cancelled. With this inventional method the phase modulation induced by cross phase modulation effect, which results in a frequency chirp of the pulse, is avoided.

The invention also proposes a device for remodulating of an optical signal with an input for line signals in a coupler. The coupler connects the line in a Raman pump laser with a piece of Raman active fiber and the Raman pump laser is connected to clock recovery device which modulates the Raman pump laser light with a bit rate frequency of the optical signal. This device has a layout without a RF modulator based on an electronic device. The signal is derived from a clock recovery device, which is an optical signal. This extracted optical clock signal is directly launched into the Raman pump.

Adapted to the special layout of the device for remodulation of optical signals the Raman pump wavelength is selected as a shorter or a longer wavelength than the signal wavelength itself.

Another preferred embodiment of the device for optical remodulation comprises at least two Raman pumps. The advantage of the second configuration is the relaxed constrains on the modulated Raman pump. Only a very limited power is sufficient to generate a strong signal modulation because of the internal Raman gain experience by this pump.

Another preferred embodiment of the device for optical remodulation uses two Roman pumps, which are modulated simultaneously with the clock recovery signal. This device avoids parasitic phase effects on the modulation. A pure phase or a pure intensity modulation is obtained.

A transmission system using the devices of the invention and an optical clock recovery signal for driving the device for remodulation of optical signals has the advantage to reduce the power consumption of the regeneration means.

BRIEF DESCRIPTION OF THE DRAWINGS

Several embodiments of the invention will be shown in the Fig. and described in the following description.

FIG. 1 describes a first embodiment of the invention. The transmission line 4 is connected to a first coupler 3a. Via the line 4 a line disturbed signal 1 is fed into the coupler 3a. The second input of the coupler 3a is connected to a Raman pump 6A. The Raman pump 6A is connected to a clock recovery device 7. The output of the coupler 3a is connected to Raman fiber piece 5. The output of the Raman fiber piece 5 is than connected again to the line 4 via a filter 8.

Coming from the transmission line a disturbed line signal 1 enters the device for remodulation. The disturbed signal 1 carries the clock signal and the bit information in form of modulation of intensity of light. For several effect of the transmission line the signal is disturbed and the intensity of the modulation decreased. The Raman pump provides a periodic clock signal, which is derived from a clock recovery system, which recovers the bit rate frequency in an electronic way. One example for a clock recovery circuit is described in EP 0 975 106. The resulting RF signal is converted to an optical signal using a standard low power gain switched DFB laser.

In another embodiment the clock signal is derived optically from the line signal. Such a solution as disclosed in EP 1 162 769 allows optical clock recovery using a device for regenerating optical signals by amplitude and phase modulation of the optical signals the device comprising: a mode locked laser enabling a clock signal to be recovered representative of the clock rate of the bits in the optical signals to be regenerated; and a modulating interferometer structure having first and second interferometer arms and enabling the amplitude and the phase of the optical signals to be modulated by said clock signal, and including at least one semiconductor optical amplifier disposed in the first interferometer arm. The mode locked laser is coupled to said first interferometer arm in such a manner that said amplifier of the first interferometer arm is a component that is common both to the mode locked laser and to said interferometer structure.

The optical signals from the optical clock recovery device can be coupled directly into the second port of the coupler 3A.

This periodic Raman pump signal is fed into the Raman amplifying fiber 5 in phase with the disturbed line signal 1. The Raman amplifying fiber 5 should be a fiber with a high Raman efficiency as for example the holy fiber of the prior art document.

The invention is also realized using conventional available fiber without special high efficiency for Raman amplification. For this kind of device two configurations are possible as shown in FIG. 2.

Figure 2:
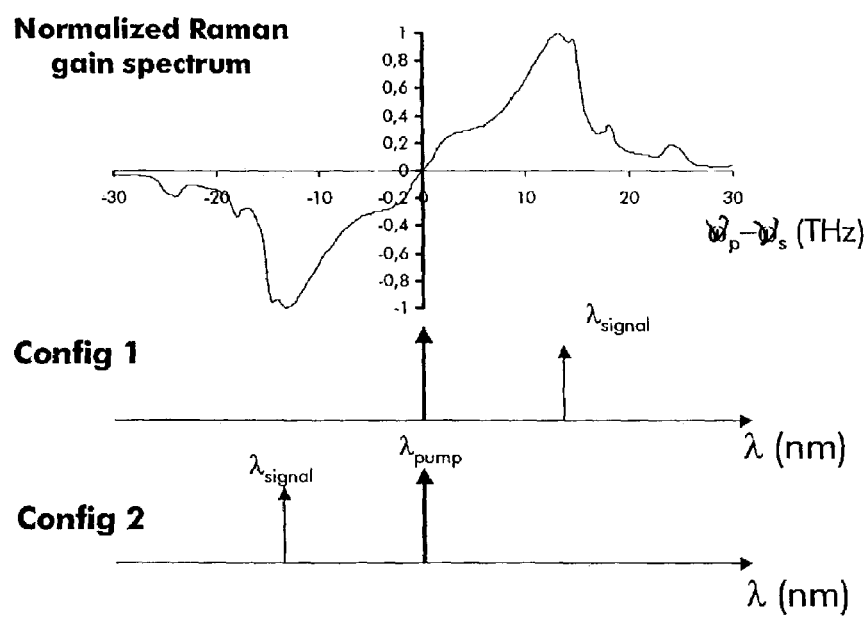
FIG. 2 a schematic wavelength scheme of the first embodiment

FIG. 2 shows in the above spectrum the normalised Raman gain spectrum, which shows the efficiency verses the difference between pump wavelength and the signal wavelength. In the first configuration the Raman pump wavelength is shorter than the signal wavelength. Than the energy transfer from the pump wavelength to the signal wavelength is following a Stoke process.

In the second configuration the pump wavelength is longer than the signal wavelength. The energy transfer is done in Anti-Stoke process. The Raman amplification takes place when the modulated Raman pump signal is in phase with the disturbed line signal. When the Raman pump signal is zero no amplification takes place and the disturbed signals or noise signals are suppressed. What can also derive from the normalised Raman spectrum is that the device works also in a wavelength multiplex and the Raman amplification can simultaneous regenerated a WDM wavelength comb when the WDM channels are resynchronised prior to the remodulation.

In the embodiment described above the Raman pump process is realized in a co-propagation with the signals. In another embodiment a counter-propagation remodultion device is realized where the Raman pump signal is fed into the Raman amplifying fiber with a coupler arranged after the Raman amplifying fiber piece in direction of the signal.

Figure 1:
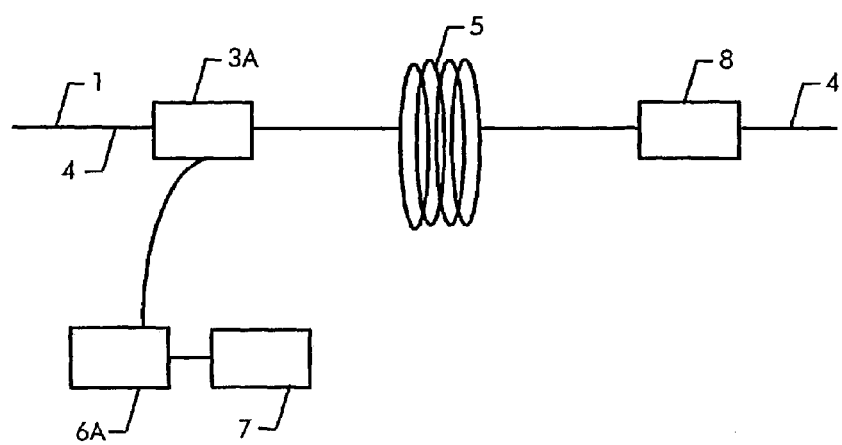
FIG. 1 shows a first embodiment of the invention
Figure 3:
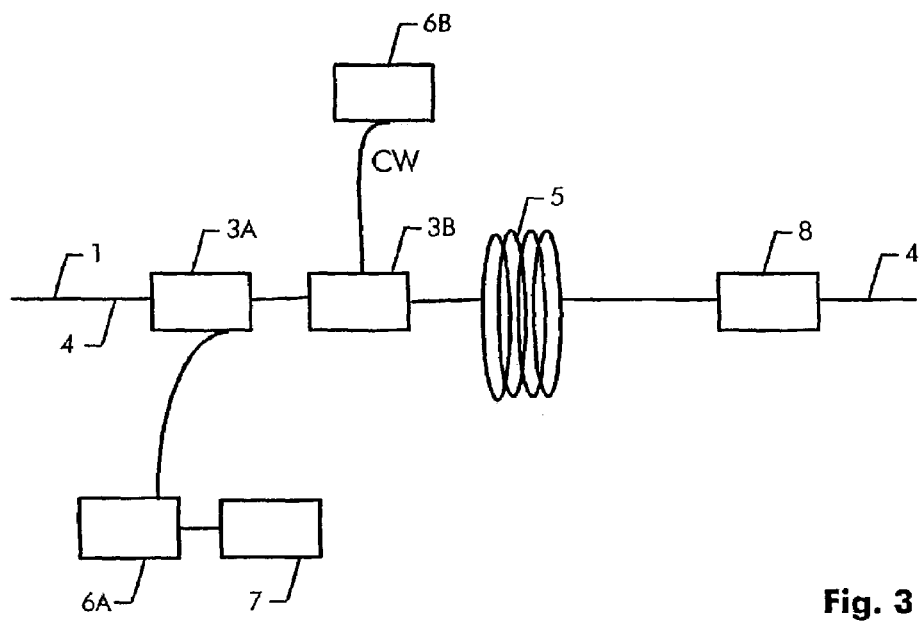
FIG. 3 a second embodiment of the invention

FIG. 3 shows a second embodiment of the invention. Additionally to the configuration of FIG. 1 a second coupler 3B between the first coupler 3A and the amplifying fiber piece 5 is arranged. This second coupler 3B is connected to a second Raman pump 6B. In this arrangement the modulated pump 6A itself is amplified by the second Raman pump 6B with a continuous wave signal. The weak signal from the optical clock recovery is directly lounged into the fiber to act as a modulated pump. The modulated signal is boosted by Raman amplification by the Raman pump 6B.

Figure 4:
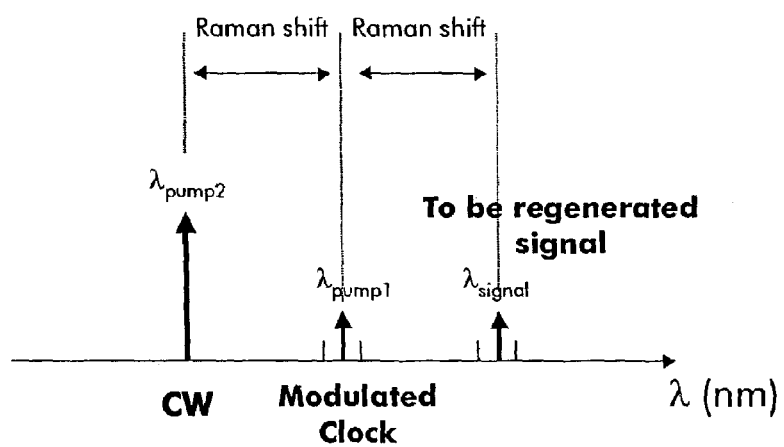
FIG. 4 a wavelength scheme for the second embodiment
Figure 5:
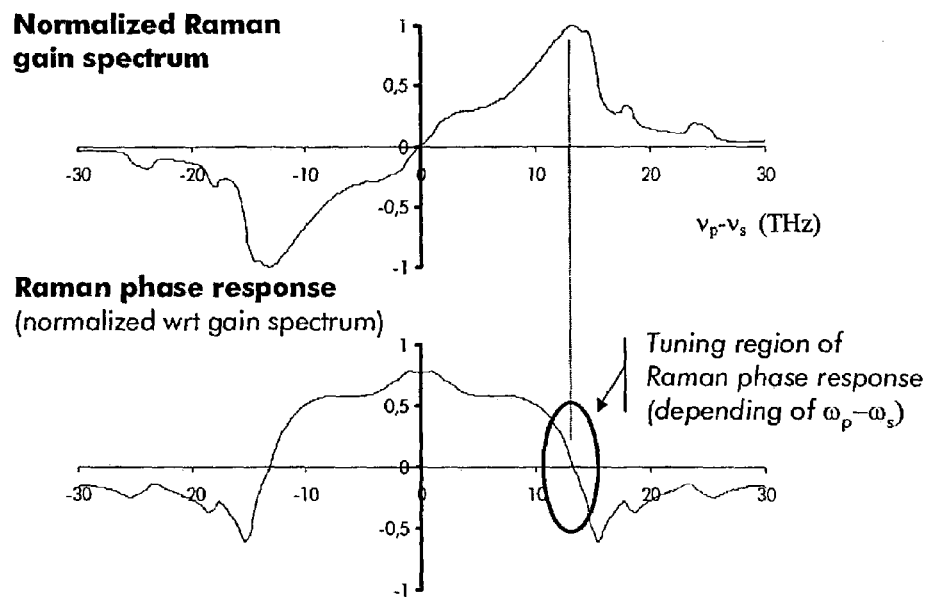
FIG. 5 the gain spectrum and phase responds of the device

FIG. 4 shows the wavelength scheme for the configuration of the device described in FIG. 3. The strong continuous-wave pump 6B pumps in the first step with λ(pump6B) the modulated Raman pump 6A and the Raman pump 6A with λ(pump6A) in a second step the wavelength λ (signal) of the signal. With this arrangement only a very low power of 100 μW to 1 mW is sufficient to generated a strong signal modulation. The arrangement of FIG. 3 shows a copropagating Raman pumping scheme. This is only an example for the inventional solution. Also counter propagating or bi-directional pumping is used to obtain the result of the inventional method. The clock recovery device 7 is not explained in details. The clock recovery can be done in several ways all-optical or in electro-optical recovery unit. The connection of the optical clock recovery device 7 to the optical transmission line is not shown in the figure.

Figure 6:
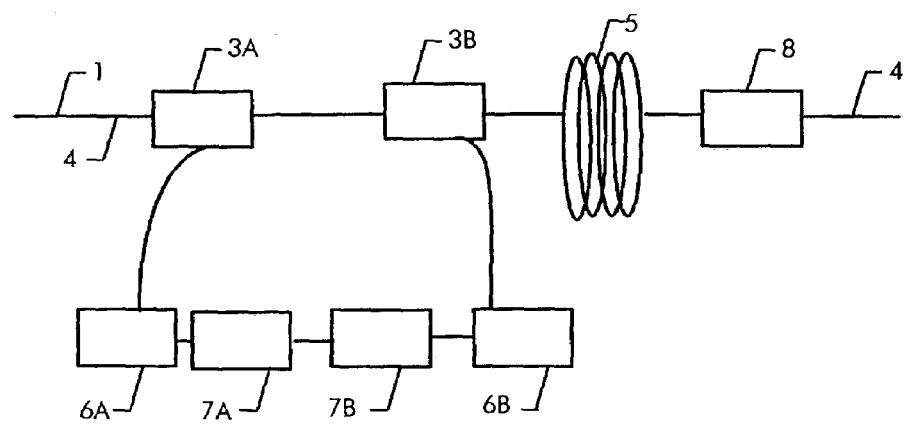
FIG. 6 a third embodiment of the invention

FIG. 6 shows the third preferred embodiment of the invention. The first coupler 3A is connected to a first Raman pump 6A and a clock recovery device 7A. The output of the first coupler 3a is via the Raman amplifying fiber piece 5 connected to a second coupler 3B. The second input of this coupler 3B is connected to a second Raman pump 6B which is also connected to a clock recovers device 7B. The clock recovery devices 7A and 7B, which are shown as two building blocks in the figure are realized as one device which couples the optical signals.

Figure 7:
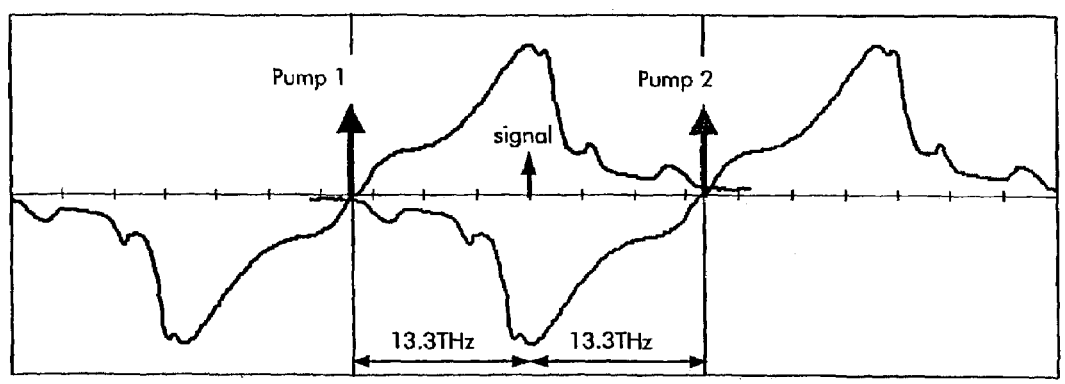
FIG. 7 a symmetric Raman arrangement spectrum.

As can been seen in FIG. 7 the first Raman pump pumps the signal with a lower wavelength and the second Raman pump pumps the signal with higher wavelength. The two wavelengths are symmetrically arranged around the signal wavelength. Raman modulates phase the problem of a phase modulation induced by cross phase modulation effect between modulated pump signal and line signal. High speed signal processing applications require non linear device response in the ns/ps time scale. Such non linear responses can be generated in standard silica fibers through the optical Kerr effect, which causes self and cross-phase modulation. As these effect are based on third order non linear interactions with very weak susceptibilities the optical power required to observe them are relatively high.

But this effect is not negligible. In a fiber of high Raman efficiency with a modulation of 10 dB on/off gain, cross phase modulation induces a phase modulation depths of the order of pi. It results in a frequency chirp of the pulse.

The Raman modulation effect can be described by equation (1) where the modulated pumps P has a periodic signal, C describes the Raman efficiency coefficient of the fiber at the pump wavelength and L is effected length of each pump:

Modulated pumps: $P_i(t) = P_i \cdot (1 + m \cdot \cos(2\pi f t))$ $C_{Ri}$: Raman efficiency coefficient of the fiber at each pump wavelength $L_{effi}$: Effective length of each pump Raman Modulation Effect $$\Delta P_{dB}(t) = \frac{10}{\ln(10)} m [C_{R1} P_1 L_{eff1} \cos(2\pi f t) - C_{R2} P_2 L_{eff2} \cos(2\pi f t + \varphi)] \quad (1)$$

The cross phase modulation effect follows the relation (2)

Cross-Phase Modulation Effect $$\Delta \Phi(t) = \frac{4\pi}{\lambda} \frac{n_2}{A_{eff}} m [P_1 L_{eff1} \cos(2\pi f t) + P_2 L_{eff2} \cos(2\pi f t + \varphi)] \quad (2)$$

coupling the two modulated pumps with the same intensity and a phase shift of $\phi = \pi$ the resulting cross phase modulation is zero, see relation 3.

→ Chirp-Free Intensity Modulation: (ref 1)

$P_1 L_{eff1} = P_2 L_{eff2}$ and $\phi = \pi$ so that $\Delta \Phi(t) = 0$ (chirp free) \quad (3)

Then the intensity modulation is:

$$\Delta P_{dB}(t) = \frac{10}{\ln(10)} m P_1 L_{eff1}(C_{R1} + C_{R2})\cos(2\pi ft + \varphi) \quad 5$$

When the phase relation between the two Raman pumps is zero a constant intensity is obtained, see relationship 4 while the phase is modulated.

→ Pure Phase Modulation: (ref 2)

$C_{R1}P_1L_{eff1} = C_{R2}P_2L_{eff2}$ and $\varphi = 0$ so that $\Delta P_{dB}(t) = 0$ (constant intensity) (4)

Then the phase modulation is:

$$\Delta\Phi(t) = \frac{4\pi}{\lambda} \frac{n_2}{A_{eff}} m P_1 L_{eff1}\left(1 + \frac{C_{R1}}{C_{R2}}\right)\cos(2\pi ft)$$

To achieve this theoretically possible perfect decoupling the modulation transfer at high bit rates requires very low chromatic dispersion between pump and signal. In the two pump device solutions the chromatic dispersion between the two pumps must also be very low. For this use the Raman fiber should be enable the same group velocity for the three implied wavelength.

The basic configuration of FIG. 6 includes also devices with more then the two Roman pumps. All kind of cascading Raman schemes working with symmetric Raman pumps are able to realize the method for remodulating a signal via a coupling of the different Raman pumps.

In a transmission system including a device for remodulating based on Raman amplification fiber the power consumption is quite lower than in conventional systems.

The invention claimed is:

1. A method for remodulation of a modulated optical signal, the method comprising:
   generating an optical clock signal which is modulated by a bit rate frequency, using a Raman pump;
   coupling the optical clock signal and a disturbed line signal;
   feeding the coupled optical clock signal and disturbed line signal into a Raman amplifying fiber; and
   tuning a phase modulation depth of the optical clock signal by adjusting at least one of a spectral position of the Raman pump in relation to the disturbed line signal or a pump power of the Raman pump.

2. The method for remodulation according to claim 1, further comprising decoupling a phase modulation and an intensity modulation of the disturbed line signal using the Raman pump having wavelengths that are symmetrically arranged around the wavelength of the disturbed line signal.

3. The method according to claim 2, further comprising modulating out of phase at least two Raman pump wavelengths symmetric to the disturbed line signal.

4. The method according to claim 2, further comprising modulating in phase at least two Raman pump wavelengths corresponding to the disturbed line signal.

5. A device for remodulation of optical signals, the device comprising:
   a transmission line for transmitting a disturbed line signal;
   a Raman pump which generates an optical clock signal;
   a coupler which couples the disturbed line signal and the optical clock signal; and
   a piece of a Raman active fiber that amplifies an outputted signal of the coupler,
   wherein the Raman pump is connected to a clock recovery device which modulates a Raman pump laser light with a bit rate frequency of the disturbed line signal and a wavelength of the optical clock signal generated by the Raman pump is shorter than the optical signal wavelength of the disturbed line signal and energy is transferred in a Stokes-Process.

6. The device according to claim 5, wherein a Raman pump wavelength is longer than a disturbed line signal wavelength and energy is transferred in an Anti-Stokes-Process.

7. The transmission system for transmission of optical signals in transmission lines comprising:
   a transmitter;
   a receiver; and
   a regeneration means in the transmission line, wherein the regeneration means comprises: a device to recover amplitude, clock and shape of the signals, and
   a clock recovery device which comprises a means to recover an optical clock signal that is connected to a remodulation device according to claim 5.

8. A device for optical remodulation of signals, the device comprising:
   a line input which transmits a disturbed line signal;
   a clock recovery device which generates a periodic clock signal;
   a first Raman pump which generates a first optical clock signal modulated by a bit rate frequency using the periodic clock signal generated by the clock recovery device;
   a first coupler which couples the line disturbed signal with the first optical clock signal;
   a second Raman pump which generates a continuous wave signal;
   a second coupler which couples an output signal of the first coupler with the continuous wave signal; and
   a piece of Raman am in fiber that amplifies an output signal of the second coupler.

9. The device according to claim 8, wherein the optical clock signal the has a shorter wavelength than the continuous wave signal and the disturbed line signal.

10. The device for optical remodulation of signals, the device comprising:
    first and second Raman pumps;
    a line input which transmits a plurality of disturbed line signals;
    a first coupler which couples the disturbed line signals with an output signal of the first Raman pump; and
    a second coupler which couples an output signal of the first coupler with an output signal of the second Raman pump; and
    a clock recovery device which provides a modulating signal for the Raman pumps, which is at least one of in phase, and out of phase for the Raman pumps.

* * * * *